United States Patent
Bhadange et al.

(10) Patent No.: US 10,381,664 B2
(45) Date of Patent: Aug. 13, 2019

(54) FUEL CELL COMPONENT HAVING SELECTED COOLING CAPACITY DISTRIBUTION

(75) Inventors: Sushant S. Bhadange, Vernon, CT (US); Jeffrey G. Lake, Vernon, CT (US)

(73) Assignee: AUDI AG, Ingolstadt (DE)

( * ) Notice: Subject to any disclaimer, the term of this patent is extended or adjusted under 35 U.S.C. 154(b) by 166 days.

(21) Appl. No.: 14/423,071

(22) PCT Filed: Aug. 30, 2012

(86) PCT No.: PCT/US2012/053086
§ 371 (c)(1),
(2), (4) Date: Feb. 20, 2015

(87) PCT Pub. No.: WO2014/035395
PCT Pub. Date: Mar. 6, 2014

(65) Prior Publication Data
US 2015/0214560 A1   Jul. 30, 2015

(51) Int. Cl.
| | | |
|---|---|---|
| *H01M 8/04* | (2016.01) | |
| *H01M 8/02* | (2016.01) | |
| *H01M 8/04007* | (2016.01) | |
| *H01M 8/0258* | (2016.01) | |
| *H01M 8/0265* | (2016.01) | |
| *H01M 8/0267* | (2016.01) | |

(52) U.S. Cl.
CPC ..... *H01M 8/04007* (2013.01); *H01M 8/0258* (2013.01); *H01M 8/0265* (2013.01); *H01M 8/0267* (2013.01)

(58) Field of Classification Search
None
See application file for complete search history.

(56) References Cited

U.S. PATENT DOCUMENTS

| | | | | |
|---|---|---|---|---|
| 6,066,408 A | * | 5/2000 | Vitale | F28D 9/0075 |
| | | | | 429/413 |
| 6,309,773 B1 | * | 10/2001 | Rock | H01M 8/0263 |
| | | | | 429/443 |
| 7,951,507 B2 | * | 5/2011 | Goebel | H01M 8/0258 |
| | | | | 429/456 |
| 2004/0067414 A1 | | 4/2004 | Wei et al. | |

(Continued)

FOREIGN PATENT DOCUMENTS

| | | | |
|---|---|---|---|
| DE | 20315716 | * | 12/2003 |
| JP | 62-73568 A | | 4/1987 |

(Continued)

OTHER PUBLICATIONS

DE20315716 English translation. Asia Pacific Fuel Cell Tech. Germany. Dec. 11, 2003. (Year: 2003).*

(Continued)

*Primary Examiner* — Christopher P Domone
(74) *Attorney, Agent, or Firm* — Seed IP Law Group LLP

(57) ABSTRACT

An exemplary fuel cell component includes a plate having a plurality of channels. At least a first one of the channels is configured differently than others of the channels so that the first channel provides a first cooling capacity to a selected portion of the plate. The others of the channels provide a second, lesser cooling capacity to at least one other portion of the plate.

19 Claims, 2 Drawing Sheets

(56) References Cited

U.S. PATENT DOCUMENTS

| | | |
|---|---|---|
| 2004/0126629 A1 | 7/2004 | Reiser |
| 2006/0088746 A1 | 4/2006 | Tuma et al. |
| 2006/0257704 A1 | 11/2006 | Ogino et al. |
| 2010/0119885 A1* | 5/2010 | Jayne .................. F28F 13/14 429/434 |
| 2011/0097648 A1 | 4/2011 | Blank |
| 2012/0141900 A1 | 6/2012 | Hahn et al. |

FOREIGN PATENT DOCUMENTS

| | | |
|---|---|---|
| JP | 62-268062 A | 11/1987 |
| JP | 3-261073 A | 11/1991 |
| JP | 4-179060 A | 6/1992 |
| JP | 7-135006 A | 5/1995 |
| JP | 8-306370 A | 11/1996 |
| JP | 9-245809 A | 9/1997 |
| JP | 2000-12049 A | 1/2000 |
| KR | 10-0826435 B1 | 4/2008 |
| KR | 100826435 * | 4/2008 |

OTHER PUBLICATIONS

International Search Report dated Feb. 18, 2013 for PCT Application No. PCT/US2012/053086 (3 pages).

* cited by examiner

FUEL CELL COMPONENT HAVING SELECTED COOLING CAPACITY DISTRIBUTION

BACKGROUND

Fuel cells are used for generating electricity based upon an electrochemical reaction. A variety of components are included within a fuel cell unit. Many of those components are typically realized in the form of a plate or sheet. For example, reactants are distributed through a fuel cell along channels formed in plates. Coolant distribution channels in plates facilitate moving a coolant fluid through the fuel cell.

Providing adequate coolant in a fuel cell is necessary to prevent membrane degradation that can result in reduced fuel cell performance or component failure. Typical coolant channel configurations direct coolant along a plurality of channels across a plate from one side including the coolant inlet to an opposite side including the coolant outlet. Such configurations have proven useful for many fuel cell arrangements but they are not capable of adequately satisfying the cooling needs in all possible fuel cell configurations.

SUMMARY

An exemplary fuel cell component includes a plate having a plurality of channels. At least a first one of the channels is configured differently than others of the channels so that the first channel provides a first cooling capacity to a selected portion of the plate. The others of the channels provide a second, lesser cooling capacity to at least one other portion of the plate.

An exemplary method of controlling a temperature within a fuel cell includes providing a first cooling capacity to a selected portion of at least one component of the fuel cell. A second, lesser cooling capacity is provided to at least one other portion of the at least one fuel cell component.

The various features and advantages of disclosed examples will become apparent to those skilled in the art from the following detailed description. The drawings that accompany the detailed description can be briefly described as follows.

DETAILED DESCRIPTION

Figure 1:
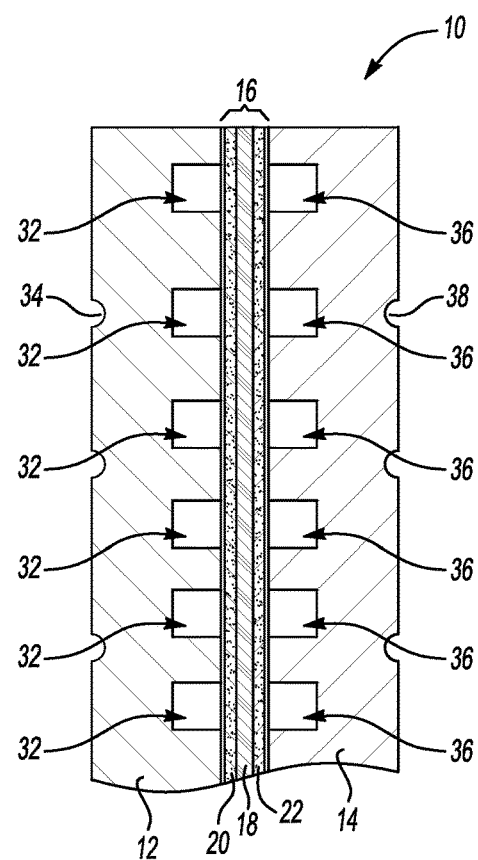
FIG. 1 schematically illustrates selected portions of a fuel cell.

FIG. 1 is a schematic, cross-sectional representation of an electrochemical cell, such as a fuel cell 10, that is useful for generating electrical energy. The example fuel cell 10 includes a plurality of components such as fluid transport plates 12 and 14. In one example, the fluid transport plate 12 is considered a cathode water transport plate and the fluid transport plate 14 is considered an anode water transport plate. The cathode and anode water transport plates 12 and 14 are at opposed sides of a membrane electrode assembly 16, which includes an electrolyte such as a proton exchange membrane 18, a cathode catalyst 20 and an anode catalyst 22. Additional known components, such as gas diffusion layers, may be included but are not shown in FIG. 1.

The cathode water transport plate 12 includes a plurality of fluid flow channels 32 that are in fluid communication with each other and the cathode catalyst 20. The example fluid transport plate 12 also includes fluid flow channels 34 that are configured to carry coolant in this example. Similarly, the anode transport plate 14 includes fluid flow channels 36 that are in fluid communication with each other and the anode catalyst 22. Coolant channels 38 are provided on the transport plate 14. In one example, the channels 32 direct an oxidant such as air within the fuel cell and the channels 36 direct a fuel such as hydrogen through the fuel cell.

Figure 2:
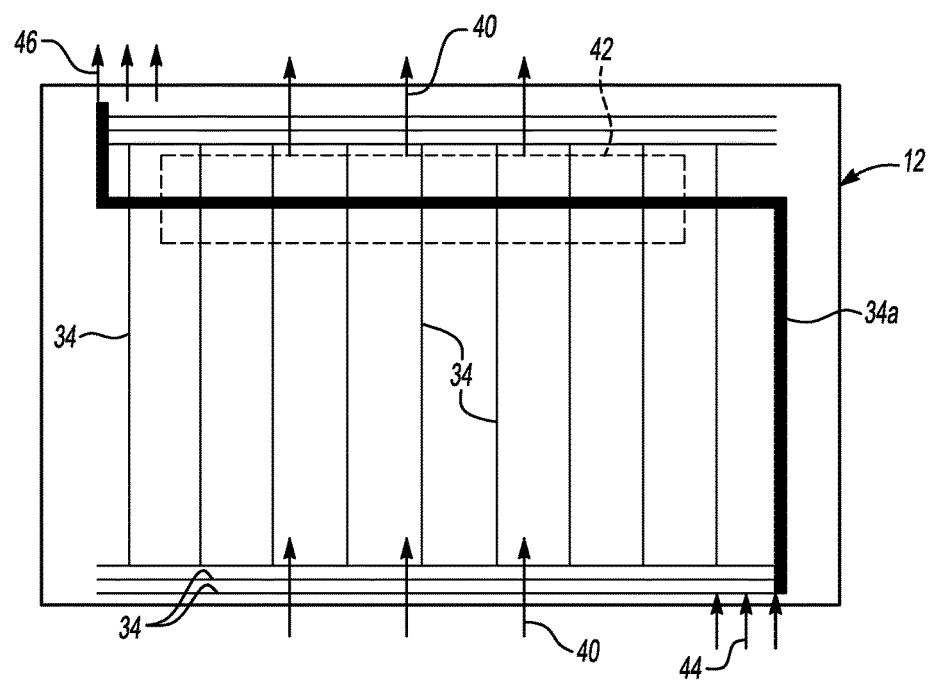
FIG. 2 schematically illustrates selected features of an example coolant distribution arrangement.

FIG. 2 schematically illustrates an example coolant distribution arrangement on the plate 12. In this example, the channels 34 are situated for distributing coolant along and across a substantial portion of the plate 12. In this example, the reactant (e.g., air) moves through the fuel cell in the direction schematically shown by the arrows 40. This results in a portion of the fuel cell that becomes hotter than other portions. As shown in FIG. 2, an area or portion 42 on the plate 12 is aligned with the portion of the fuel cell that experiences higher temperatures during fuel cell operation. The coolant distribution arrangement in FIG. 2 is configured to provide a higher cooling capacity to the portion 42 compared to the cooling capacity provided to at least one other portion of the plate 12. Providing more cooling capacity to the portion 42 addresses the need for reducing the temperature at the portion of the fuel cell that becomes hotter during fuel cell operation.

The channels 34 in the example of FIG. 2 include a first channel 34A that is configured differently than others of the channels 34. In this example, the channel 34A has a greater flow capacity compared to the other channels 34. A higher flow capacity allows for delivering a higher volume of coolant per unit of time compared to a lesser flow capacity. In one example, the channel 34A has a larger cross-section compared to the cross-section of the other channels 34. The cross-section in this example is considered in a direction that is generally perpendicular to a direction of coolant flow through the channels.

In the example of FIG. 2, the coolant flows through an inlet 44 into the channels 34, 34A and exits through a coolant outlet 46. As can be appreciated from the drawing, the channel 34A provides a significant amount of coolant directly to the portion 42 to provide an increased cooling capacity at that portion. In this example, more coolant is provided to the portion 42 compared to other portions of the plate 12. The larger volume of coolant provides a greater cooling capacity along the portion 42 compared to other portions of the plate 12.

While the example of FIG. 2 shows a single channel 34A configured differently than the other channels 34, it is possible to provide multiple channels specifically configured for delivering a higher cooling capacity to a selected portion of a fuel cell component corresponding to an area of the fuel cell that is subjected to higher temperatures.

Figure 3:
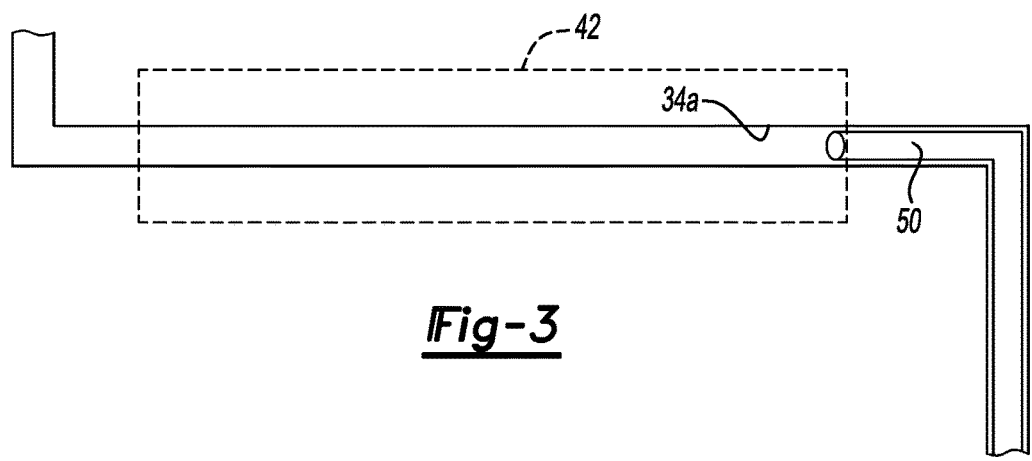
FIG. 3 schematically illustrates a feature that is useful with an example like that shown in FIG. 2.

FIG. 3 schematically illustrates another example arrangement for providing a greater cooling capacity to or along a selected portion 42 of a fuel cell component. This example includes an insulating member 50 along at least some of the length of the first channel 34A. The insulating member 50 in this example comprises a tube that resists heat exchange between coolant within the tube 50 and the portions of the fuel cell near the coolant within the tube 50. Preventing heat exchange along at least some of the length of the first channel 34A provides coolant having a lower temperature when it arrives at the area of the portion 42 compared to the temperature that coolant would have had if it were exposed in a manner that would have allowed heat exchange between that coolant and the surrounding environment within the fuel cell. The insulating member 50 facilities delivering a lower temperature coolant to a selected portion of a fuel cell component. This provides a greater cooling capacity at the location where the coolant eventually is exposed for heat exchange and cooling purposes.

Figure 4:
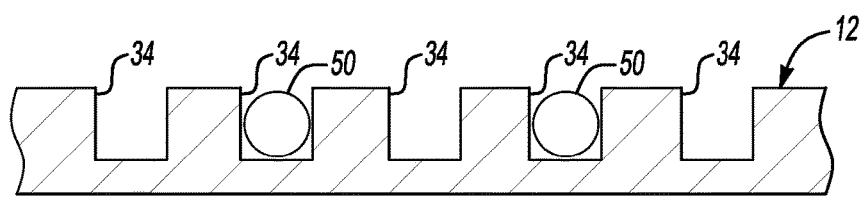
FIG. 4 schematically illustrates selected features of another example coolant distribution arrangement.

FIG. 4 schematically shows another example configuration of a coolant distribution arrangement. In this example, each of the channels 34 has the same flow capacity. Some of the channels 34 include insulating members 50, such as tubes, that at least partially insulate coolant within them from heat in the surrounding environment within the fuel cell. Coolant flowing through the insulating members or tubes 50 remains colder compared to coolant in corresponding sections of the length of nearby channels 34 that do not include insulating members 50. Providing at least one of the channels 34 with an insulating member 50 to control heat exchange between the coolant and the surrounding environment within the fuel cell along at least some of the length of that channel allows for delivering coolant at a lower temperature to a selected portion of the fuel cell. This provides a greater cooling capacity where the relatively lower temperature coolant is eventually allowed to be used for heat exchange and cooling.

Figure 5:
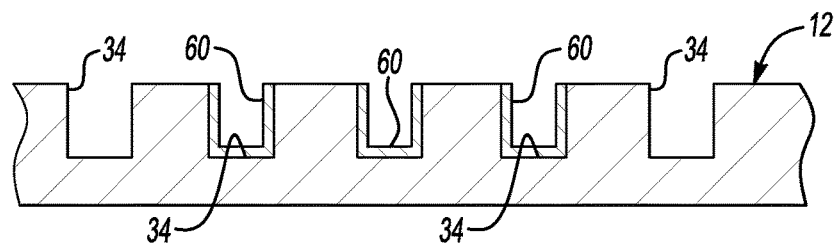
FIG. 5 schematically illustrates selected features of another example coolant distribution arrangement.

FIG. 5 schematically illustrates another example arrangement. In this example, at least some of the channels 34 include an insulating coating 60 that is configured to resist heat exchange between coolant in corresponding portions of those channels 34 and the surrounding environment within the fuel cell. The coating 60 is provided along a selected length of at least a selected one of the channels 34 so that when the coolant arrives at the portion of the channel without the coating 60, the coolant has a lower temperature than it otherwise would have had without the coating 60 in place. That relatively lower temperature coolant provides a greater cooling capacity in the area where heat exchange with the surrounding environment in the fuel cell is possible in an unhindered manner.

Several example coolant distribution arrangements are disclosed that facilitate providing different cooling capacities to different portions of a fuel cell component such as a water transport plate for providing different levels of cooling in different areas of the fuel cell. The example arrangement allow for providing a greater cooling capacity at selected portions of a fuel cell to address hot spots or areas that experience greater temperatures during fuel cell operation. The disclosed examples allow for maintaining a more uniform temperature distribution throughout a fuel cell. Moreover, the disclosed examples contribute to avoiding fuel cell component degradation due to elevated temperatures, which enhances fuel cell life and performance.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell component, comprising:
a plate having a plurality of reactant channels and a plurality of coolant channels, the plurality of reactant channels allowing a reactant to move across the plate in a reactant direction from a first edge of the plate to a second edge of the plate opposite to the first edge, at least a first one of the coolant channels being configured differently than others of the coolant channels so that the first coolant channel provides a first cooling capacity to a selected portion of the plate and the others of the coolant channels provide a second, lesser cooling capacity to at least one other portion of the plate, wherein the first coolant channel extends across the plate in a first direction transverse to the reactant direction established by the plurality of reactant channels, wherein the others of the coolant channels extend across the plate in a second direction parallel to the reactant direction established by the plurality of reactant channels, and wherein the first coolant channel extends across the others of the coolant channels.

2. The fuel cell component of claim 1, wherein the first coolant channel has a first flow capacity that is greater than a second flow capacity of the others of the coolant channels.

3. The fuel cell component of claim 2, wherein:
the first coolant channel has a first cross-sectional area that is generally perpendicular to a direction of flow along the first coolant channel;
the others of the coolant channels each have a second, smaller cross-sectional area that is generally perpendicular to a corresponding direction of flow along each of the others of the coolant channels.

4. The fuel cell component of claim 2, wherein:
the first coolant channel directs a first volume of coolant to the selected area within a cooling period; and
the others of the coolant channels direct a second, lesser volume of coolant to the other area within the cooling period.

5. The fuel cell component of claim 2, wherein:
the first coolant channel comprises an insulating member situated along at least a section of the first coolant channel; and
the insulating member is configured to resist any heat absorption by any coolant in the section of the first coolant channel.

6. The fuel cell component of claim 5, wherein the portion of the first coolant channel extends between an inlet to the first coolant channel and a section of the first coolant channel along the selected portion of the plate.

7. The fuel cell component of claim 1, wherein:
the first coolant channel is configured to direct coolant having the first cooling capacity to the selected portion of the plate; and
the others of the coolant channels are configured to direct coolant having the second cooling capacity to the other portions of the plate.

8. The fuel cell component of claim 7, wherein the cooling capacity comprises a temperature of the coolant and wherein coolant providing the first cooling capacity is colder than coolant providing the second cooling capacity.

9. The fuel cell component of claim 7, wherein:
the first coolant channel comprises an insulating member situated along at least a portion of the first coolant channel; and
the insulating member is configured to resist any heat absorption by any coolant in the portion of the first coolant channel.

10. The fuel cell component of claim 9, wherein the portion of the first coolant channel extends between an inlet to the first coolant channel and a section of the first coolant channel along the selected portion of the plate.

11. A method of managing a temperature within a fuel cell, comprising:
providing a first cooling capacity to a selected portion of at least one fuel cell plate, the fuel cell plate including a plurality of reactant channels and a plurality of coolant channels, the plurality of reactant channels allowing a reactant to move across the fuel cell plate in a reactant direction from a first outermost edge of the plate to a second outermost edge of the plate opposite to the first outermost edge, wherein at least a first one of the coolant channels provides the first cooling capacity to the selected portion of the fuel cell plate, the first coolant channel extending across the plate in a first direction transverse to the reactant direction established by the reactant channels; and
providing a second, lesser cooling capacity to at least one other portion of the fuel cell plate, wherein others of the coolant channels provide the second, lesser cooling capacity to the other portion of the fuel cell plate, the others of the coolant channels extending across the plate in a second direction parallel to the reactant direction established by the reactant channels.

12. The method of claim 11, wherein the first coolant channel has a first flow capacity that is greater than a second flow capacity of each of the others of the coolant channels.

13. The method of claim 12, wherein the first coolant channel has a first cross-sectional area and the others of the coolant channels each have a second, smaller cross-sectional area.

14. The method of claim 11, comprising:
directing a first volume of coolant to the selected portion within a cooling period; and
directing a second, lesser volume of coolant to the other portion within the cooling period.

15. The method of claim 11, comprising:
providing an insulating member situated along at least a section of at least one of the coolant channels wherein the insulating member is configured to resist any heat absorption by any coolant in the section of the coolant channel.

16. The method of claim 11, wherein the first cooling capacity comprises a first volume of coolant within a cooling period and the second cooling capacity comprises a second, lesser volume of coolant within the cooling period.

17. The method of claim 11, wherein the first cooling capacity comprises a first temperature of coolant and wherein the second cooling capacity comprises a second, higher temperature of the coolant.

18. The fuel cell component of claim 1 wherein a first portion of the first coolant channel extends across the plate in the first direction, and wherein a second portion of the first coolant channel extends across the plate in the second direction.

19. The method of managing a temperature within a fuel cell of claim 11 wherein a first portion of the first coolant channel extends across the plate in the first direction, and wherein a second portion of the first coolant channel extends across the plate in the second direction.

* * * * *